United States Patent Office 3,455,305
Patented July 15, 1969

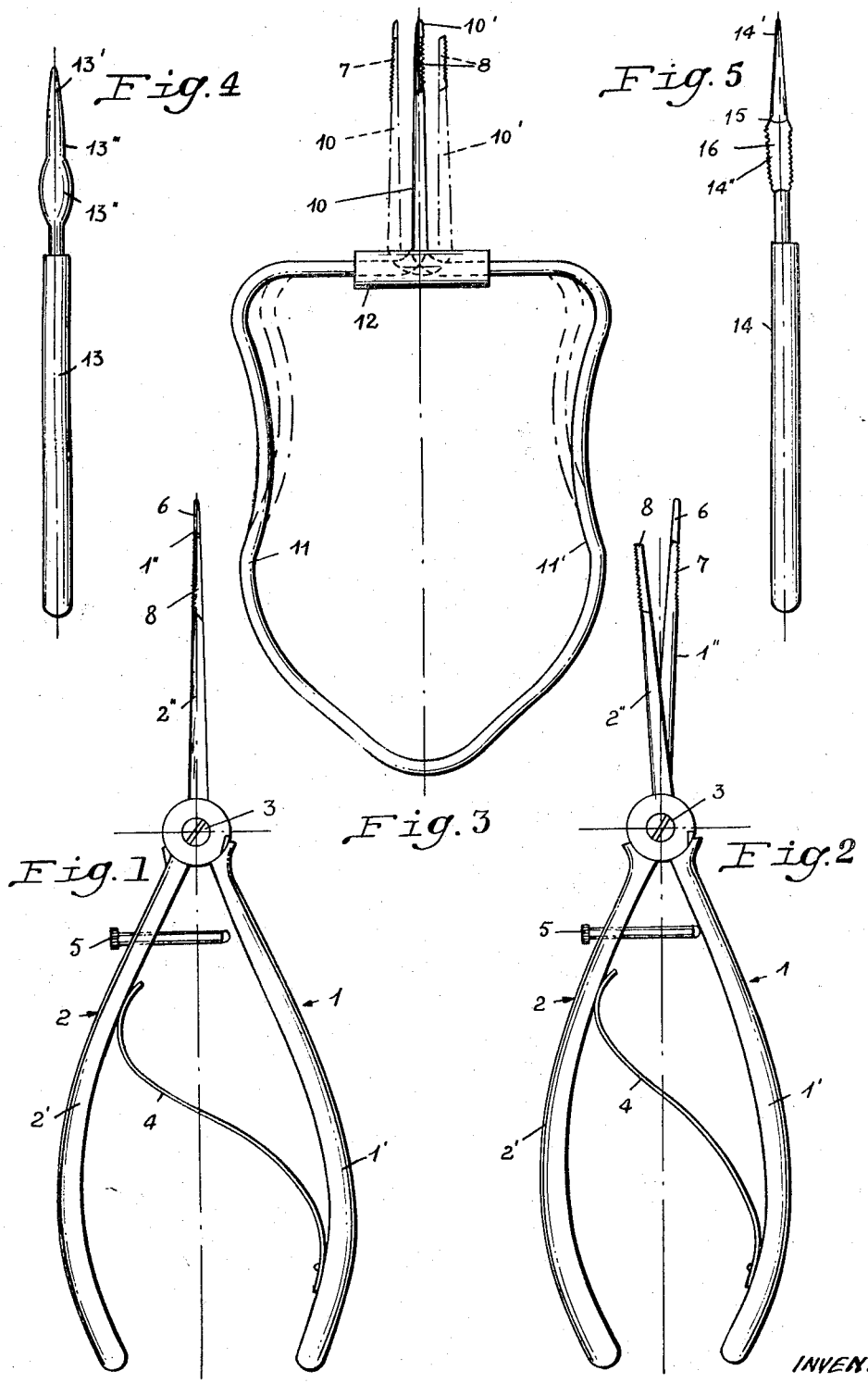

3,455,305
SURGICAL TEAT KNIFE
Ulric Oscar Marie Ransy, 6 Rue Chaumont,
Stavelot, Belgium
Filed June 21, 1966, Ser. No. 559,279
Claims priority, application Belgium, June 22, 1965,
665,788
Int. Cl. A61b 17/32
U.S. Cl. 128—305     3 Claims

ABSTRACT OF THE DISCLOSURE

A surgical teat knife, in the form of forceps, comprising two arms carrying each, at their ends, a saw blade facing in the direction of opening, the saw blades covering each other and forming a surface without projections, the instrument being in the closed position.

---

This invention relates to a surgical instrument called a teat knife, designed to enlarge the orifice or sphincter of teats in cows which are difficult to milk or in which the udder is crushed or congested by injury.

The orifice or sphincter of a cow is made of elastic fibres and if these fibres are tight or hard, a considerable effort is required to open them up and enable the milk to escape, and that is why one then says the cow is hard to milk. It is then necessary to cut a few fibres inside this sphincter to enlarge it and make it easier to open.

Teat knives hitherto known or used consisted of a small simple or triangular knife which cut part of the fibres of the sphincter. These instruments had the disadvantage that it was impossible to limit the extent of the incision to obtain a sufficient flow of milk without producing too large a cut which would cause continuous loss of milk.

The operation proved difficult and dangerous with such an instrument. Moreover, these clean knife cuts have a tendency to grow together rapidly so that the effect is not permanent and the operation has to be frequently repeated.

It is in order to overcome these disadvantages that it is proposed according to the invention to provide a teat knife which is characterised in that the instrument is in the form of forceps, spring forceps, scissors or the like each of the two arms of which carries at its end a serrated or saw blade pointing in the opening direction.

According to another feature of the invention, these serrated blades cover each other when the instrument is closed, so that the instrument can easily be inserted in the teat.

According to yet another feature of the invention, the teat knife is in the form of a rod which comprises a conical insertion tip and behind this, serrated edges pointing in the opposite direction and cutting the tissue only on withdrawal of the instrument.

The invention further provides a dilator in the form of a rod which has a conical insertion tip and a calibrated enlargement. This instrument is for use after the teat knife, for the purpose of rounding the internal orifice of the sphincter.

To enable the invention to be more clearly understood, it will now be described with reference to the attached drawing which is given solely by way of example and in which:

FIGS. 1 and 2 show two plan views of a teat knife according to the invention in the form of forceps, in the closed and open position respectively;

FIG. 3 is a plan view of another embodiment of teat forceps with the open position indicated in broken lines;

FIG. 4 is a plan view of a calibrated dilator according to the invention; and

FIG. 5 a plan view of a teat knife with cutting edge according to the invention.

The surgical instrument shown in FIGS. 1 and 2, termed a teat knife, has the form of forceps the arms 1 and 2 of which are joined together to pivot at 3. When the forceps are gripped so that the lower arms 1' and 2' are brought together, they are subjected to the action of a blade spring 4 which is attached to the lower arm 1' and bears against the lower arm 2', and the extent to which these two arms can be approximated is regulated by an abutment screw 5. The upper arms 1" and 2", that is to say the arms on the other side of the pivot 3, move apart when the lower arms 1', 2' are approximated, i.e. when the forceps are gripped by the handle, and they constitute the instrument properly speaking.

The upper arms 1", 2" are each in the form of a rod of semi-circular section and when the instrument is closed, these rods overlap to form a round rod. The upper arm 1" has an end portion 6 which is not semi-circular but rounded and projects over the end of the upper arm 2" to present a continuous surface when the teat knife is introduced into the sphincter.

On the side facing the direction of opening of the instrument, each upper arm 1", 2" has the profile of a saw blade 7, 8 respectively. These saw blades may be formed on the rounded semi-circular parts of the rods or on a flat part of the rods, as shown in the drawing.

When the instrument is closed, the arms are placed over each other at 3 in such a manner that the arms 1", 2" cover each other exactly and the saw blades do not project beyond the rounded rod thereby formed.

The two upper arms 1", 2" form a round rod 2 to 3 mm. in diameter which can be introduced into the teat without causing any pain to the cow. Once the rod has been introduced into the teat, all that is necessary is to grip the handle 1', 2'—and the extent to which this is done is regulated in advance by the abutment screws 5— to open the two arms 1", 2" and to withdraw the instrument sharply from the teat while keeping the said arms open.

Some fibres of the sphincter are thereby cut and the sphincter becomes more extensible and milking is thereby greatly facilitated.

Due to the fact that the teat knife according to the invention cuts from the inside outwards, the lesion is wider on the inside than on the outside, the milk flows out more easily and the external wound is smaller and very rarely becomes infected.

Another embodiment of a teat knife according to the invention is shown in FIG. 3. In this embodiment, the teat knife consists of a spring bar bent round to form forceps the two ends 10, 10' of which form the upper arms while the middle part constitutes the lower arms 11, 11' or handle.

As in the embodiment shown in FIGURES 1 and 2, the two upper arms cover each other in the closed position and have a saw blade profile 7, 8 directed in the sense of opening of the instrument.

The two arms 10, 10' are joined together at their base inside a tube 12 which is so formed that the said arms exactly overlap in their closed position and lie substantially in the same plane in their open position.

Such a teat knife in the form of a spring as shown in FIG. 3 has the advantage that it can be mass produced at low cost.

It is to be understood that one could have a teat knife different from those described above and shown in the drawing but having the main features of the invention without thereby going outside the scope of the invention.

The internal fibres of the sphincter which have been torn by the teat knife according to the invention cannot join up again owing to the use of a dilator as shown in FIG. 4 by means of which these small tears can be opened up to prevent rapid scar formation. This dilator has the further advantage of rounding the sphincter so that a smooth flow of milk without splashing is produced.

The dilator according to the invention has the form of a rod 13 the upper part of which, constituting the instrument properly speaking, consists of a conical insertion tip 13′ followed by a calibrated enlargement 13″. Between the conical tip 13′ and the enlarged portion 13″ there may advantageously be provided a part of uniform section 13‴ larger than the largest section of the tip 13′ but smaller than that of the enlargement 13″. One can thus use the dilator without introducing it to its full depth, i.e. without making use of the enlargement.

In cases where a severely crushed teat requires repeated intervention into a highly congested and inflamed tissue, a teat knife is used which is not in the form of forceps or the like but in the form of a rod 14 (FIG. 5) the upper part of which, forming the instrument properly speaking, presents a conical insertion tip 14′ and a flat part 14″ which projects beyond the tip but is connected to it by fillets 15. The edges of the part 14″ have saw teeth 16 directed downwards, which tear only when the instrument is being withdrawn, painless introduction of the instrument being facilitated by the conical tip 14′ and the fillets 15.

In practice, for primiparae and cows with slender teats, it is sufficient to introduce the tip of the forceps or spring instrument, to open the instrument by 1 cm. and withdraw it sharply and then enlarge the opening slightly with the dilator. For fleshy and hard teats, a complete incision made with the whole length of the cutting part of the instrument, followed by complete introduction of the dilator is necessary. In cases of haematoma and crushed teats, an even deeper incision is required. In the case of papillomata, the affected area must first be surrounded by a circle of adhesive plaster to prevent the teat dilating in this region and to enable small cuts to penetrate the tumour.

What is claimed is:

1. A surgical teat knife, in the form of forceps, comprising two arms carrying each, at their ends, a saw blade facing in the direction of opening, the saw blades covering each other and forming a surface without projections, the instrument being in the closed position.

2. The teat knife according to claim 1, wherein the saw blades are cut on semi-circular rods which cover each other to form a round rod.

3. The teat knife according to claim 2, comprising a handle with adjustable extent of opening.

References Cited

UNITED STATES PATENTS

| 673,598 | 5/1901 | Dolge | 128—345 XR |
| 1,899,492 | 2/1933 | Beebe | 128—341 |
| 2,647,278 | 8/1953 | Weinberger | 81—302 XR |
| 2,664,894 | 1/1954 | Gariepy | 128—341 XR |
| 2,951,482 | 9/1960 | Sullivan | 128—317 |

FOREIGN PATENTS

| 273,427 | 4/1914 | Germany. |
| 145,703 | 6/1962 | U.S.S.R. |

OTHER REFERENCES

German printed application No. 1,124,184, Stumer, February 1962.

L. W. TRAPP, Primary Examiner